United States Patent
Wang et al.

(10) Patent No.: US 11,237,415 B2
(45) Date of Patent: Feb. 1, 2022

(54) METHOD FOR REPAIRING A DISPLAY PANEL AND A DISPLAY PANEL

(71) Applicants: BOE TECHNOLOGY GROUP CO., LTD., Beijing (CN); HEFEI XINSHENG OPTOELECTRONICS TECHNOLOGY CO., LTD., Anhui (CN)

(72) Inventors: Haiping Wang, Beijing (CN); Xu Yan, Beijing (CN); Pingping Jia, Beijing (CN); Ying Xi, Beijing (CN); Dong Guo, Beijing (CN)

(73) Assignees: BOE TECHNOLOGY GROUP CO., LTD., Beijing (CN); HEFEI XINSHENG OPTOELECTRONICS TECHNOLOGY CO., LTD, Anhui (CN)

( * ) Notice: Subject to any disclaimer, the term of this patent is extended or adjusted under 35 U.S.C. 154(b) by 576 days.

(21) Appl. No.: 16/303,735
(22) PCT Filed: Mar. 23, 2018
(86) PCT No.: PCT/CN2018/080181
§ 371 (c)(1),
(2) Date: Nov. 21, 2018
(87) PCT Pub. No.: WO2019/007107
PCT Pub. Date: Jan. 10, 2019

(65) Prior Publication Data
US 2021/0223582 A1    Jul. 22, 2021

(30) Foreign Application Priority Data

Jul. 7, 2017    (CN) .......................... 201710549833.7

(51) Int. Cl.
*G02F 1/13*    (2006.01)
*G02F 1/1335*    (2006.01)

(52) U.S. Cl.
CPC ...... *G02F 1/1309* (2013.01); *G02F 1/133512* (2013.01); *G02F 1/133516* (2013.01)

(58) Field of Classification Search
None
See application file for complete search history.

(56) References Cited

U.S. PATENT DOCUMENTS

| | | | |
|---|---|---|---|
| 2009/0141231 A1* | 6/2009 | Lim | G02F 1/1309 349/192 |
| 2012/0002155 A1* | 1/2012 | Lin | G02F 1/136259 349/192 |

(Continued)

FOREIGN PATENT DOCUMENTS

| | | |
|---|---|---|
| CN | 101779157 A | 7/2010 |
| CN | 102629004 A | 8/2012 |

(Continued)

OTHER PUBLICATIONS

Search Report and Written Opinion for International Application No. PCT/CN2018/080181 dated Jun. 26, 2018.

(Continued)

*Primary Examiner* — Ryan Crockett
(74) *Attorney, Agent, or Firm* — Calfee Halter & Griswold LLP (57) ABSTRACT

A method of repairing a display panel comprising: determining a pixel where a bright spot defect resides and a position of the bright spot in the pixel; setting a repair region, the repair region being a region in the pixel including the bright spot defect and having an area smaller than that of a single pixel region; forming a black material layer in the repair region, the black material layer being used for preventing light emitted from a directly-below portion thereof from leaving a display surface of the display panel.

3 Claims, 4 Drawing Sheets

(56) References Cited

U.S. PATENT DOCUMENTS

| | | | |
|---|---|---|---|
| 2013/0010242 A1* | 1/2013 | Minowa | G02F 1/133512 |
| | | | 349/110 |
| 2014/0035839 A1 | 2/2014 | Cho | |
| 2017/0090223 A1* | 3/2017 | Kim | G02F 1/133512 |
| 2017/0123264 A1 | 5/2017 | Li et al. | |
| 2018/0154572 A1* | 6/2018 | Richter | B23K 26/0624 |
| 2020/0271966 A1* | 8/2020 | Kim | G02F 1/133528 |

FOREIGN PATENT DOCUMENTS

| | | | |
|---|---|---|---|
| CN | 102650750 A | | 8/2012 |
| CN | 102654661 A | * | 9/2012 |
| CN | 105068304 A | | 11/2015 |
| CN | 105182592 A | | 12/2015 |
| KR | 20070031141 | | 3/2007 |
| KR | 20170037726 | | 4/2017 |

OTHER PUBLICATIONS

First Office Action for Chinese Patent Application No. 201710549833.7 dated Jun. 26, 2019.

Search Report from European Patent Application No. 18800821.3 dated Feb. 12, 2021.

* cited by examiner

METHOD FOR REPAIRING A DISPLAY PANEL AND A DISPLAY PANEL

RELATED APPLICATION

The present application is the U.S. national phase entry of PCT/CN2018/080181, with an international filing date of Mar. 23, 2018, which claims the benefit of Chinese Patent Application No. 201710549833.7, filed on Jul. 7, 2017, the entire disclosure of which is incorporated herein by reference.

FIELD

The present disclosure relates to the field of display panel repair technologies, and specifically to a method for repairing a display panel and to a display panel.

BACKGROUND

In a preparation process of a liquid crystal display panel, particles are inevitably generated. If these particles fall in a pixel (i.e. an area where display is actually performed), they will affect the liquid crystal deflection, and the positions thereof may become bright spots visible in the display, leading to a bright spot defect.

In order to solve this bright spot defect problem, data input of a respective pixel is usually cut off so that the entire pixel becomes a dark spot where display activity is not performed. The presence of these dark spots is usually not noticed because human eyes are less sensitive to dark spots.

However, dark spots have an impact on the display effect after all. As a result, various liquid crystal display panel product manufacturers have limited the number of dark spots that are acceptable. Some some high-end product manufacturers do not allow the presence of any dark spots.

SUMMARY

An exemplary embodiment of the present disclosure proposes a method for repairing a display panel. The display panel comprising a plurality of pixels for display. Each of the pixels including a color filter film on a substrate. At least some of the pixels having a bright spot defect, where the bright spot defect is a constantly bright spot within a single pixel region. The method comprising: determining a pixel where the bright spot defect resides and a position of the bright spot defect in the pixel; setting a repair region, the repair region being a region in the pixel which includes the bright spot defect and having an area smaller than that of the single pixel region; forming a black material layer in the repair region for preventing light emitted from a portion directly below the bright spot defect from leaving a display surface of the display panel.

In some exemplary embodiments, the plurality of pixels are spaced apart from each other, a black matrix is disposed between color filter films of adjacent pixels, and at least one side of the repair region is connected to the black matrix, wherein forming a black material layer in the repair region includes: generating a gap between the color filter film in the repair region and the substrate using a laser, and partially granulating the black matrix connected to the repair region by the laser to form black matrix particles; and causing the black matrix particles to get into the gap between the color filter film in the repair region.

Further, in some exemplary embodiments, the step of partially granulating the black matrix connected to the repair region using a laser to form black matrix particles is performed prior to the step of generating a gap between the color filter film in the repair region and the substrate by a laser.

In some exemplary embodiments, energy of the laser for generating a gap between the color filter film in the repair region and the substrate is higher than that of the laser for partially granulating the black matrix connected to the repair region.

In some exemplary embodiments, parameters of the laser for generating a gap between the color filter film in the repair region and the substrate include: for a red filter film, wavelength: 349 nm; energy: 1035 to 1125 nJ; operating rate: 60 to 80 μm/s, and frequency: 40 to 60 Hz; for a green filter film, wavelength: 349 nm; energy: 765 to 855 nJ; operating rate: 60 to 80 μm/s, and frequency: 40 to 70 Hz; for a blue filter film, wavelength: 349 nm; energy: 540 to 810 nJ; operating rate: 70 to 90 μm/s, and frequency: 50 to 70 Hz. Parameters of the laser for partially granulating the black matrix connected to the repair region comprise: wavelength: 349 nm; energy: 200 to 400 nJ; operating rate: 150 to 300 μm/s; and frequency: 40 to 60 Hz.

In some exemplary embodiments, the method further comprises: performing aging treatment on the color filter film in the repair region and the black matrix connected to the repair region by a laser prior to generating a gap between the color filter film in the repair region and the substrate by a laser, and partially granulating the black matrix connected to the repair region by a laser to form black matrix particles.

In some embodiments, parameters of the laser for the aging treatment include: wavelength: 349 nm; energy: 200 to 400 nJ; operating rate: 150 to 300 μm/s; frequency: 40 to 60 Hz.

In some exemplary embodiments, the method further comprises: after causing the black matrix particles to get into the gap between the color filter film and the substrate, uniformly diffusing the black matrix particles in the gap by laser.

In some exemplary embodiments, parameters of the laser for uniformly diffusing the black matrix particles in the gap include: wavelength: 349 nm; energy: 650 to 675 nJ; operating rate: 100 to 150 μm/s; and frequency: 40 to 60 Hz.

In some exemplary embodiments, forming a black material layer in the repair region includes: performing carbonization treatment on the color filter film in the repair region by a laser.

In some exemplary embodiments, parameters of a laser for the carbonization treatment include: for red and green filter films, wavelength: 446 nm; energy: 1050 to 1350 nJ; operating rate: and 60 to 80 μm/s; and for a blue filter film, wavelength: 446 nm; energy: 1350 to 1590 nJ; operating rate: and 60 to 80 μm/s.

In some exemplary embodiments, the method further comprises: performing modification treatment on the color filter film in the repair region by laser prior to performing carbonization treatment on the color filter film in the repair region.

In some exemplary embodiments, parameters of the laser for the modification treatment include: wavelength: 349 nm; energy: 200 to 400 nJ; operating rate: 150 to 300 μm/s; and frequency: 40 to 60 Hz.

Further, the display panel in the foregoing embodiments includes, but is not limited to, a liquid crystal display panel.

Another exemplary embodiment of the present disclosure provides a display panel comprising a plurality of pixels for display, each of the pixels including a color filter film on a substrate. Color filter films of at least part of the pixels have an opaque region, the opaque region being smaller than a single pixel region. The opaque region includes a black material layer which prevents light emitted from a directly-below portion thereof from leaving a display surface of the display panel.

In some exemplary embodiments, the plurality of pixels are spaced apart from each other, a black matrix is disposed between color filter films of adjacent pixels, and at least one side of the opaque region is adjacent to the black matrix, wherein the black material layer includes black matrix particles obtained by partially granulating the black matrix adjacent to the opaque region by a laser.

In some exemplary embodiments, the black material layer includes a carbonized color filter film obtained by performing carbonization treatment on the color filter film.

DETAILED DESCRIPTION

To enable those skilled in the art to better understand the technical solution of the present disclosure, exemplary embodiments of the present disclosure will be further described in detail below with reference to the accompanying drawings and examples.

As shown in FIGS. 1 to 5, an exemplary embodiment of the present disclosure provides a method for repairing a bright spot defect 8 in a display panel, wherein the display panel comprises a plurality of pixels 1 for performing display, and each of the pixels 1 has a color filter film 2 on a substrate 9. At least part of the pixels 1 have a bright spot defect 8, and the bright spot defect 8 is a constantly bright spot in the pixel 1.

The method according to this exemplary embodiment is used for repairing the bright spot defect 8 in the display panel. The display panel to which it is applicable has a plurality of pixels 1 for display and each of the pixels 1 is provided with a color filter film 2 of a respective color. The bright spot defect 8 refers to a partial area in the pixel 1 which always emits light when the display panel is operating. This partial area of the pixel 1 can emit light, but cannot emit light according to a brightness that should be displayed or a desired brightness. For example, the partial area of the pixel 1 may always maintain certain brightness, or the brightness thereof may have a deviation from the brightness that should be displayed, so that the bright spot defect 8 is a constantly bright spot. Moreover, the above bright spot defect 8 is only located in a partial area of the pixel 1. In other words, the size of a single bright spot defect 8 should be smaller than the pixel 1, and regions other than the bright spot defect 8 in the pixel 1 can still be normally displayed.

It is to be understood that the bright spot defect 8 in each figure only schematically indicates its position, and does not represent the shape of the bright spot defect 8, nor does it mean that the bright spot defect 8 is located between two substrates.

In an exemplary embodiment of the present disclosure, the above display panel includes a liquid crystal display panel.

The bright spot defect 8 is usually caused by particles in the display panel. The liquid crystal display panel achieves display by liquid crystal deflection, but the presence of particles affects the liquid crystal deflection, so the liquid crystal display surface is most likely to suffer from a bright spot defect 8. The method proposed by an exemplary embodiment of the present disclosure may also be applied to repair the bright spot defect 8 in other types of display panels.

Hereinafter, the method for repairing a display panel as proposed by an exemplary embodiment of the present disclosure is described by means of specific examples.

Figure 6A:
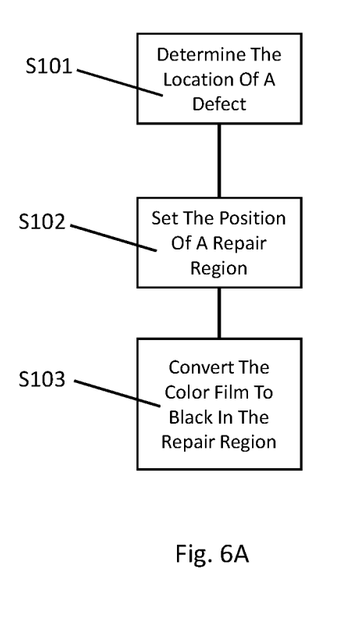
FIGS. 6A-6C are flow diagrams illustrating the steps of a method of repairing a display panel.

Referring to FIG. 6A, in an exemplary embodiment, the method for repairing a display panel comprises the following steps.

In step S101, a pixel 1 where a bright spot defect 8 resides and a position of the bright spot defect 8 in the pixel 1 are determined.

For example, a pixel 1 having a bright spot defect 8 can be found by a detecting means such as microscopic observation, and the position of the bright spot defect 8 in the pixel 1 can be determined.

In step S102, a repair region 11 is set. The repair region 11 is a region in the pixel 1 including the bright spot defect 8, but the repair region 11 does not include the entire area of the pixel 1, that is, a partial area of the pixel 1 does not belong to the repair region 11.

That is, in this step, a repair region 11 is determined in the pixel 1 that has the bright spot defect 8, and the repair region 11 needs to include the bright spot defect 8 therein, but does not occupy the entire pixel 1. That is, a part of the pixel 1 does not belong to the repair region 11.

Figure 1:
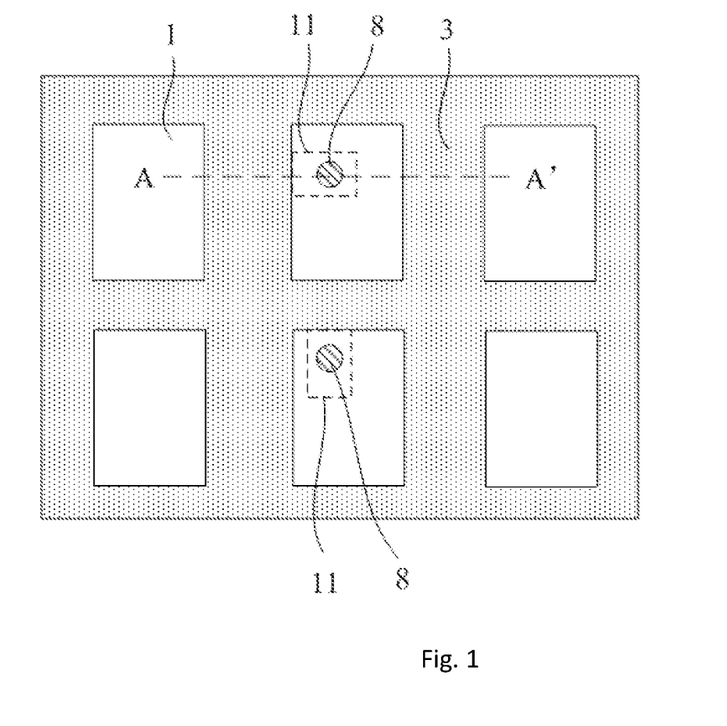
FIG. 1 schematically illustrates a structural top view of a display panel before a method for repairing a display panel according to an exemplary embodiment of the present disclosure is applied.
Figure 2:
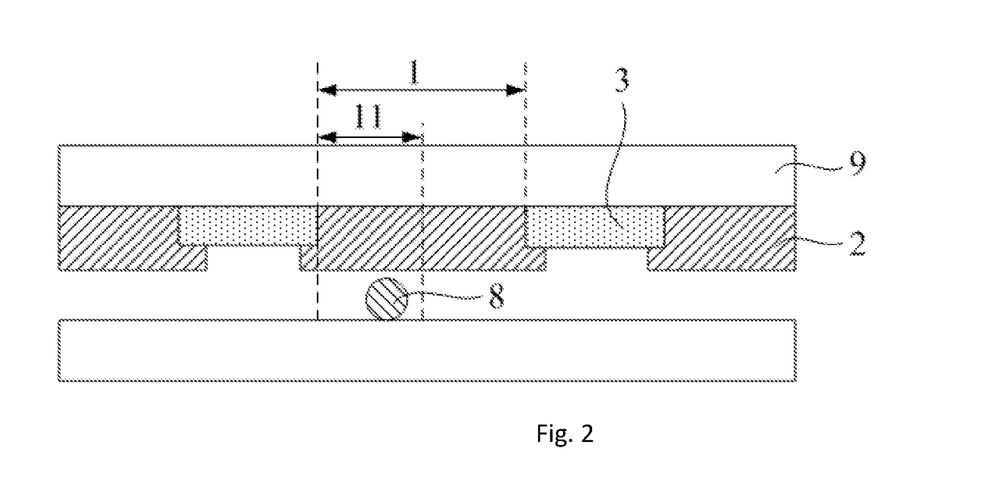
FIG. 2 is a schematic sectional view taken along line AA' in FIG. 1.

In an example, as shown in FIG. 1 and in FIG. 2, in order to ensure a better repairing effect, the repair region 11 may be slightly larger than the bright spot defect 8, and has a regular shape such as a rectangle.

It is to be understood that, the above steps merely detect and determine the bright spot defect 8 in the pixel 1 and set the repair region 11 for the pixel 1 according to the bright spot defect 8, but do not involve actual operations on the display panel.

In step S103, the color filter film 2 in the repair region 11 is converted into a black color.

That is, in this step, the color filter film 2 in the repair region 11 is converted into a black color by a certain means, so that light cannot be emitted from the repair region 11. That is, light at the bright spot defect 8 cannot be emitted out, thereby finishing the repair.

With the method for repairing a display panel according to this exemplary embodiment, the color filter film 2 to which the position of the bright spot defect 8 corresponds is converted into black, so that light at the bright spot defect 8 cannot be emitted out, thus the region in the pixel corresponding to the bright spot defect 8 will not emit light. That is, the black filter film will prevent light emitted from a a portion directly-below the black filter film portion thereof from leaving the display surface of the display panel. Since the human eyes are insensitive to a dark object, the repaired position (i.e., the pixel region corresponding to the bright spot defect 8) is usually not noticed). At the same time, in the repair, only the partial area of the pixel 1 which has the bright spot defect 8 is darkened, and the other portions of the pixel 1 are still displayed normally. Therefore, the repair will not generate a completely dark spot in the display panel, thus having a smaller impact on the display effect. The method for repairing a display panel as proposed by an exemplary embodiment of the present disclosure imposes no limitation on the number of maintenance points. This results in a wide application range and can achieve high repair efficiency.

In some exemplary embodiments, the plurality of pixels 1 in the display panel are spaced apart from each other, and a black matrix 3 is disposed between color filter films 2 to which adjacent pixels 1 correspond. The repair region 11 is set such that at least one side thereof is connected to the black matrix 3.

As shown in FIG. 1, a plurality of pixels 1 in a display panel are spaced apart from each other at an interval, and the interval is not for display but for arrangement of driving structures such as leads. Thus, a black matrix 3 for blocking light needs to be disposed at the interval, and the black matrix 3 is located between color filter films 2 to which adjacent pixels 1 correspond, thus a side of the color filter film 2 is adjacent to the black matrix 3. Of course, as shown in FIGS. 2 to 5, due to actual processes and the like, the black matrix 3 and the adjacent color filter film 2 may also have some overlapping portions. But in such exemplary embodiments, the black matrix 3 is still located between color filter films 2 to which adjacent pixels 1 correspond.

As shown in FIG. 1 and FIG. 2, in this case, the repair region 11 is connected to the black matrix 3. That is, the repair region 11 extends to the edge of the pixel 1 rather than being in the middle of the pixel 1 in isolation.

Figure 6B:
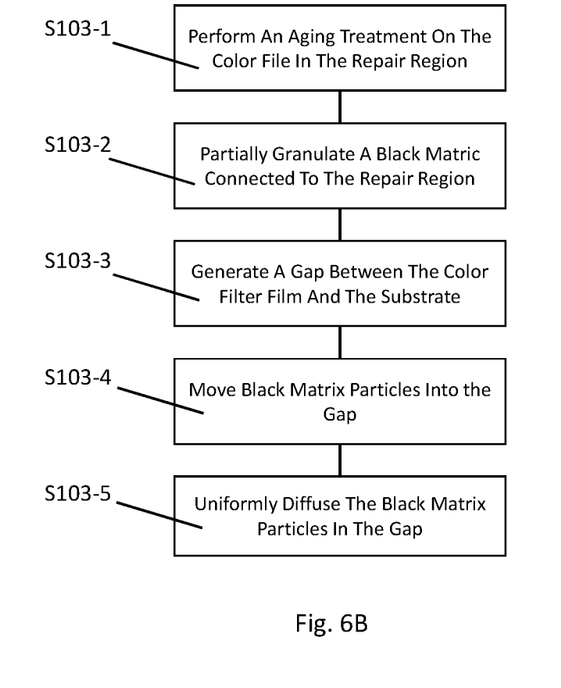

As illustrated in FIG. 6B, the above step S103 may include the following sub-step:

S103-1, an aging treatment is performed using a laser on the color filter film 2 in the repair region 11 and the black matrix 3 connected to the repair region 11.

For example, the color filter film 2 in the repair region 11 and the black matrix 3 connected to the repair region 11 may be irradiated with a laser so that they are preheated and aged, making them more suitable for subsequent steps.

In an exemplary embodiment, parameters of the laser for irradiating the color filter film 2 in the repair region 11 and the black matrix 3 connected to the repair region 11 are: wavelength: 349 nm; energy: 200 to 400 nJ; operating rate: 150 to 300 µm/s; and frequency: 40 to 60 Hz. For example, parameters of the laser for irradiating the color filter film in the repair region and the black matrix connected to the repair region are: wavelength: 349 nm; energy: 350 nJ; operating rate: 200 µm/s; and frequency: 50 Hz. Although exemplary values of the wavelength of the laser are mentioned herein, for example, 349 nm, light having other wavelength parameters is also possible, and no limitation is imposed on the wavelength parameters of the laser in the present disclosure. In addition, with the aid of an energy attenuator, different energies may also be obtained for laser sources having the same wavelength parameter.

The laser parameters in exemplary embodiments of the present disclosure are particularly suitable for processing a partial area of the pixel 1. If the pixel 1 is to be processed as a whole, the laser parameters to be used are necessarily different.

In sub-step S103-2, the black matrix 3 connected to the repair region 11 is partially granulated by a laser to form black matrix particles 31.

Figure 3:
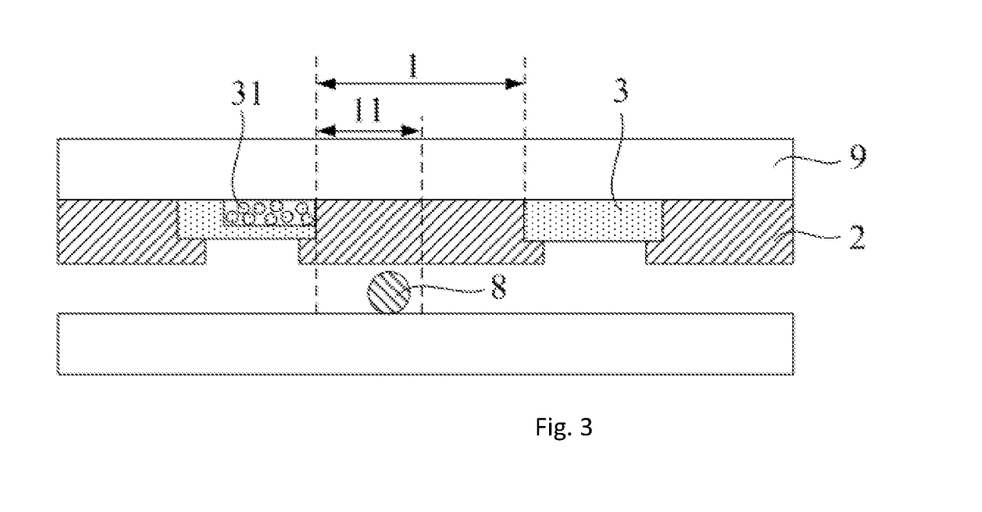
FIG. 3 is a schematic structural view of a black matrix of FIG. 2 after granulation.

As shown in FIG. 3, the black matrix 3 connected to the repair region 11 is irradiated with a laser to destroy the action of molecular bonds therein, so that part of the black matrix 3 (such as the black matrix 3 close to the substrate 9) is converted into black particles (black matrix particles 31).

In an exemplary embodiment, parameters of the laser for granulating the black matrix 3 are: wavelength: 349 nm; energy: 200 to 400 nJ; operating rate: 150 to 300 µm/s; and frequency: 40 to 60 Hz. For example, parameters of the laser for granulating the black matrix 3 are: wavelength: 349 nm; energy: 350 nJ; operating rate: 200 µm/s; frequency: 50 Hz.

In sub-step S103-3, a gap 21 is generated between the color filter film 2 in the repair region 11 and the substrate 9 by a laser.

Figure 4:
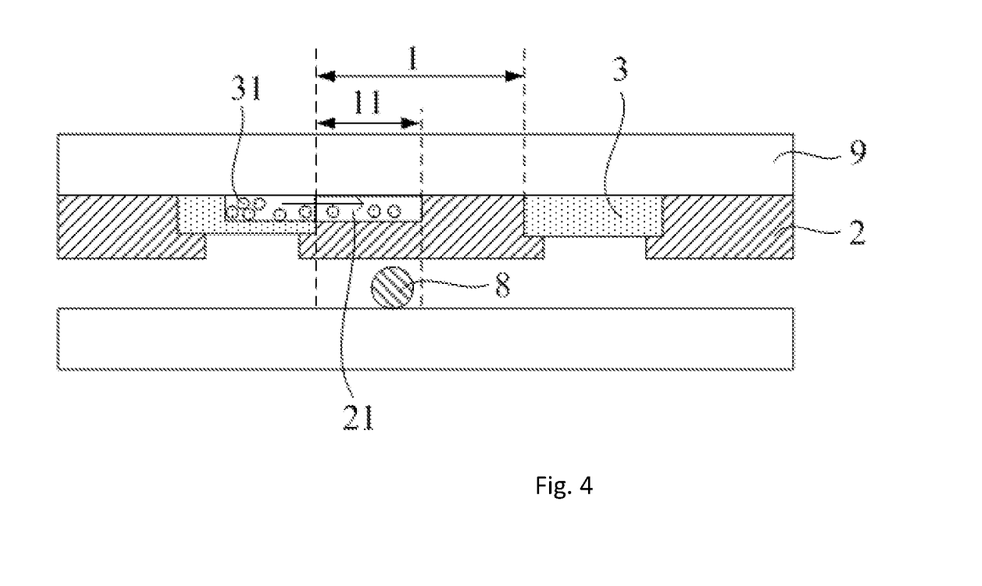
FIG. 4 is a schematic structural view after a gap is formed between the color filter film and the substrate in FIG. 3.

As shown in FIG. 4, the color filter film 2 in the repair region 11 is irradiated with laser to cause minute shrinkage, thereby generating a gap 21 between the color filter film 2 and the substrate 9.

In an exemplary embodiment, parameters of the laser for generating a gap between the color filter film and the substrate are: for a red filter film, wavelength: 349 nm; energy: 1035 to 1125 nJ; operating rate: 60 to 80 µm/s; and frequency: 40 to 60 Hz; for a green filter film, wavelength: 349 nm; energy: 765 to 855 nJ; operating rate: 60 to 80 µm/s; and frequency: 40 to 70 Hz; for a blue filter film, wavelength: 349 nm; energy: 540 to 810 nJ; operating rate: 70 to 90 µm/s; and frequency: 50 to 70 Hz. In other exemplary embodiments, the laser parameters described above are: for a red filter film, wavelength: 349 nm; energy: 1080 nJ; operating rate: 70 µm/s; and frequency: 53 Hz; for a green filter film, wavelength: 349 nm; energy: 810 nJ; operating rate: 70 µm/s; frequency: and 45 Hz; for a blue filter film, wavelength: 349 nm; energy: 770 nJ; operating rate: 80 µm/s; and frequency: 60 Hz.

Since the color filter films 2 of different colors have different transmittances to laser, the color filter films 2 of different colors may have different laser parameter ranges.

It is to be understood that the sub-step S103-3 of generating a gap 21 between the color filter film 2 and the substrate 9 and the sub-step S103-2 of partially granulating the black matrix 3 do not have a necessary sequence relationship. However, in order to avoid the occurrence of bubbles, the step of granulating the black matrix may be performed first, followed by the step of generating a gap 21.

In sub-step S103-4, the black matrix particles 31 are moved into the gap 21 between the color filter film 2 and the substrate 9.

As shown in FIG. 4, the black matrix particles 31 are separated from other portions of the black matrix 3, so that they can move freely into the gap 21 between the color filter film 2 and the substrate 9, thereby converting the color filter film 2 of the repair region 11 into black. The black matrix 3 is not granulated, but still remains between the pixels 1.

The amount of black matrix particles 31 can be determined based on the size of the repair region 11. If the black matrix particles 31 are insufficient to fill the gap 21 of the entire repair region 11, the black matrix may continue to be granulated.

In an additional exemplary embodiment illustrated in sub-step S103-5, the black matrix particles 31 in the gap 21 are uniformly diffused by a laser.

Figure 5:
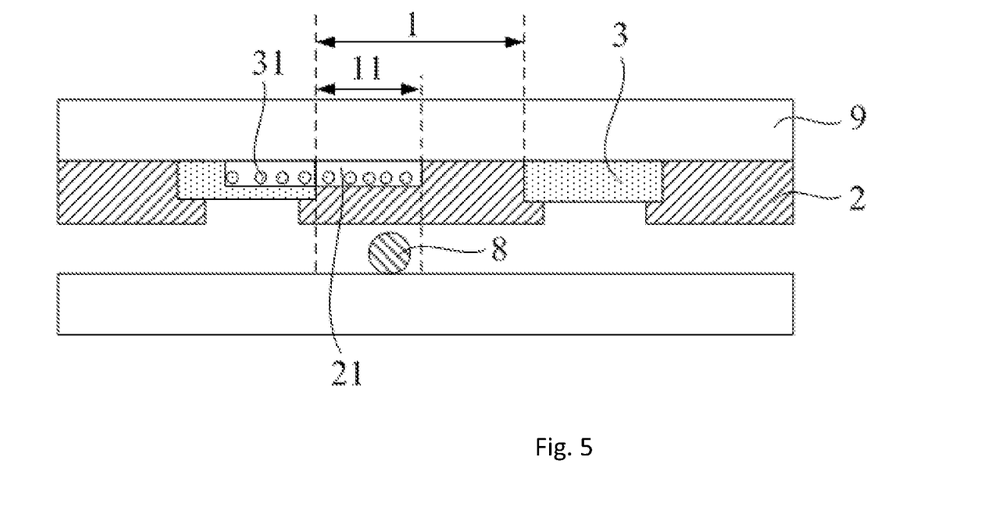
FIG. 5 is a schematic structural view after the black matrix particles of FIG. 4 are uniformly diffused.

As shown in FIG. 5, the black matrix particles 31 may fall into the gap 21 by themselves, but the distribution thereof is not necessarily uniform, and the entire repair region 11 may be not well covered. Therefore, the black matrix particles 31 in the gap 21 can be guided to move by laser irradiation (the black matrix particles may move following the movement of laser), so that they are diffused uniformly throughout the gap 21.

Parameters of the laser for uniformly diffusing the black matrix particles in the gap include: wavelength: 349 nm; energy: 650 to 675 nJ; operating rate: 100 to 150 μm/s; and frequency: 40 to 60 Hz. For example, parameters of the laser for uniformly diffusing the black matrix particles in the gap are: wavelength: 349 nm; energy: 660 nJ; operating rate: 120 μm/s; and frequency: 50 Hz.

Figure 6C:
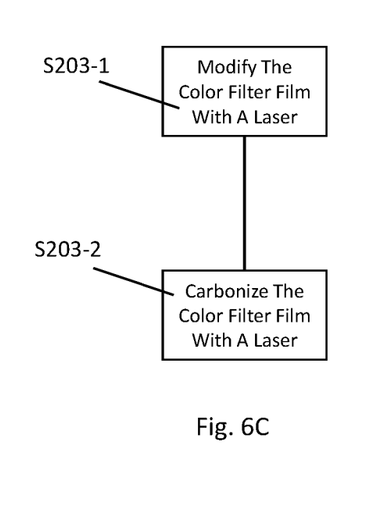
Figure 7:
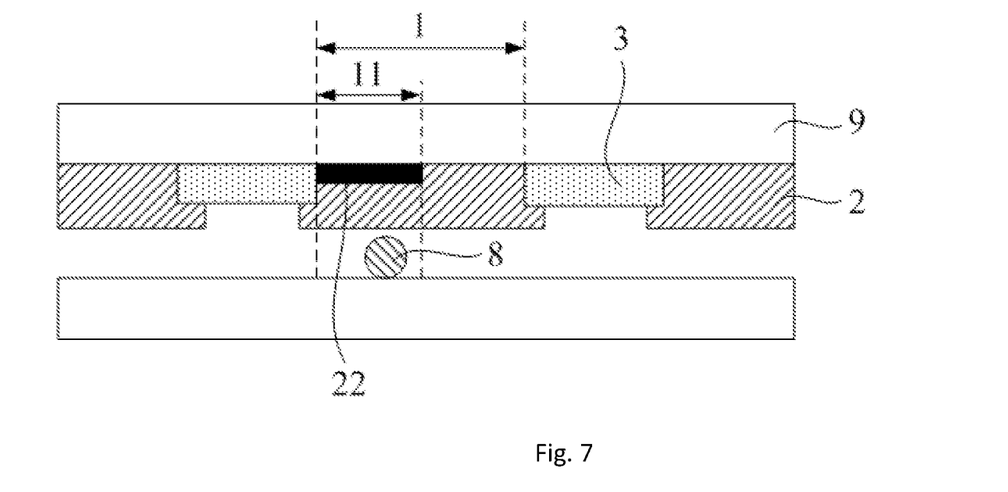
FIG. 7 is a schematic structural view after a portion of the color filter film of FIG. 2 is carbonized.

As shown in FIG. 1, FIG. 2, and FIG. 7, another exemplary embodiment of the present disclosure also provides a method for repairing a bright spot defect 8 in a display panel, which is similar to the method for repairing a bright spot defect 8 in a display panel as described in the foregoing exemplary embodiment with the exception of how the color film 2 is converted into black in the repair region 11. As shown in FIG. 6C, in this exemplary embodiment, converting the color filter film 2 in the repair region 11 into black may include the following sub-steps. S203-1 modification treatment is performed on the color filter film 2 in the repair region 11 by a laser.

That is, the color filter film 2 in the repair region 11 is irradiated with a laser to change its molecular structure and improve its heat resistance, making it suitable for subsequent carbonization treatment.

In an exemplary embodiment, parameters of the laser for performing modification treatment on the color filter film 2 in the repair region 11 are: wavelength: 349 nm; energy: 200 to 400 nJ; operating rate: 150 to 300 μm/s; and frequency: 40 to 60 Hz. For example, parameters of the laser for performing modification treatment on the color filter film in the repair region are: wavelength: 349 nm; energy: 350 nJ; operating rate: 200 μm/s; and frequency: 50 Hz.

In sub-step S203-2, carbonization treatment is performed on the color filter film 2 in the repair region 11 by a laser.

As shown in FIG. 7, the color filter film 2 in the repair region 11 is irradiated with a laser and directly carbonized to form a carbonized color filter film 22. Since carbon is black, the carbonized color filter film 22 is black. This is equivalent to converting the color filter film 2 in the repair region 11 into black.

In an exemplary embodiment, the above laser parameters are: for red and green filter films, wavelength: 446 nm; energy: 1050 to 1350 nJ; and operating rate: 60 to 80 μm/s; for a blue filter film, wavelength: 446 nm; energy: 1350 to 1590 nJ; and operating rate: 60 to 80 μm/s. For example, parameters of the laser for directly carbonizing the color filter film to form the carbonized color filter film 22 are: for red and green filter films, wavelength: 446 nm; energy: 1200 nJ; and operating rate: 70 μm/s; for a blue filter film, wavelength: 446 nm; energy: 1500 nJ; and operating rate: 70 μm/s.

In this exemplary embodiment, the color filter film 2 is directly carbonized and blackened, thereby achieving the purpose of converting the color filter film 2 in the repair region 11 into black. Therefore, in this exemplary embodiment, only the color filter film 2 in the repair region 11 is subjected to treatment, without the need to perform treatment on the black matrix 3.

Of course, it is to be understood that the methods described in the foregoing different exemplary embodiments are not contradictory. For example, if necessary, it is also possible to first carbonize the color filter film 2 in the repair region 11, and then cause the black matrix particles 31 to get into the gap 21 between the carbonized color filter film 22 and the substrate 9.

It is also feasible to convert the color filter film 2 in the repair region 11 into black by other methods.

A further exemplary embodiment of the present disclosure provides a display panel that has been repaired by the method for repairing a bright spot defect in a display panel as described above.

Therefore, the display panel should have had a bright spot defect, and the color filter film in a partial area around the bright spot defect thereof has been converted into black by methods such as granulation of the black matrix, carbonization, and the like, so that the repair is finished.

This exemplary embodiment provides a display device including the display panel described above.

Specifically, the display device may be any product or component having a display function, such as an electronic paper device, a mobile phone, a tablet computer, a television, a display, a notebook computer, a digital photo frame, a navigation system, and the like.

It can be understood that the above embodiments are exemplary embodiments used only for illustrating the principle of the present invention, and that the present invention is not so limited. Various variations and improvements may be made by those ordinarily skilled in the art without departing from the spirit and essence of the present disclosure. These variations and improvements are regarded as falling within the scope of the present invention.

The invention claimed is:

1. A method for repairing a display panel, the display panel comprising a plurality of pixels for display, each of the pixels including a color filter film on a substrate, at least a portion of the pixels having a bright spot defect, the bright spot defect being a constantly bright spot within a single pixel region, wherein the method comprises:
   determining a pixel where the bright spot defect resides and a position of the bright spot defect in the pixel;
   setting a repair region, the repair region being a region in the pixel including the bright spot defect and having an area smaller than that of the single pixel region; and
   forming a black material layer in the repair region for preventing light emitted from a directly-below portion thereof from leaving a display surface of the display panel,
   wherein forming a black material layer in the repair region comprises: performing carbonization treatment on the color filter film in the repair region using a laser, and performing modification treatment on the color filter film in the repair region using a laser prior to performing carbonization treatment on the color filter film in the repair region;
   and wherein parameters of the laser for the modification treatment comprise: a wavelength of 349 nm; an energy level of 200 to 400 nJ; an operating rate of 150 to 300 μm/s; and a frequency of 40 to 60 Hz, wherein the operating rate is a traveling speed of the laser device.

2. The method according to claim 1, wherein parameters of the laser for the carbonization treatment comprise:
   for red and green filter films, a wavelength of 446 nm; an energy level of 1050 to 1350 nJ; and an operating rate of 60 to 80 μm/s; for a blue filter film, a wavelength of 446 nm; an energy level of 1350 to 1590 nJ; and an operating rate of 60 to 80 μm/s.

3. The method according to claim 1, wherein the display panel is a liquid crystal display panel.

\* \* \* \* \*

UNITED STATES PATENT AND TRADEMARK OFFICE
CERTIFICATE OF CORRECTION

| | |
|---|---|
| PATENT NO. | : 11,237,415 B2 |
| APPLICATION NO. | : 16/303735 |
| DATED | : February 1, 2022 |
| INVENTOR(S) | : Haiping Wang et al. |

It is certified that error appears in the above-identified patent and that said Letters Patent is hereby corrected as shown below:

On the Title Page

The second Assignee in item (73) should read as follows:
---HEFEI XINSHENG OPTOELECTRONICS, TECHNOLOGY CO., LTD., Anhui (CN)---

Signed and Sealed this
Twelfth Day of December, 2023

Katherine Kelly Vidal
*Director of the United States Patent and Trademark Office*